July 20, 1937. R. A. GOEPFRICH 2,087,378
BRAKE
Original Filed Dec. 1, 1932  2 Sheets-Sheet 1
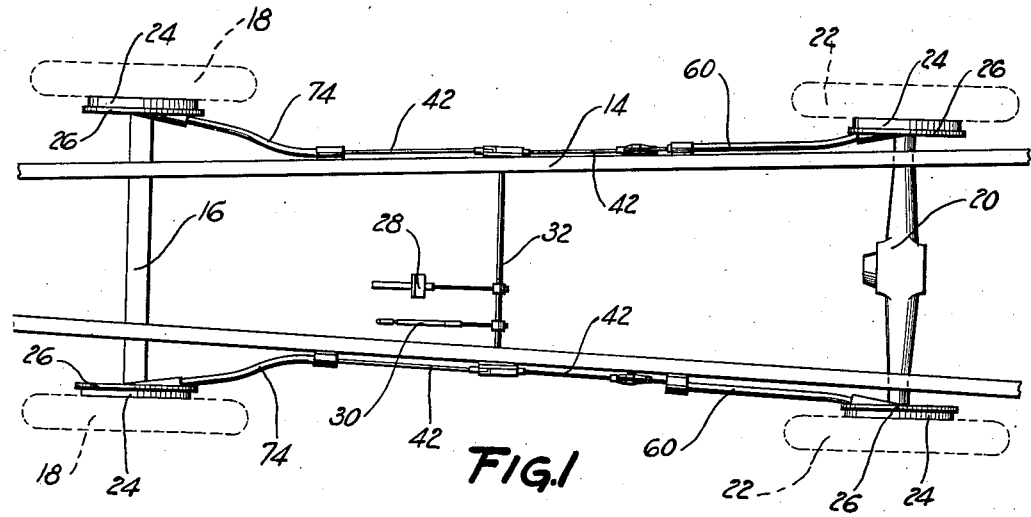
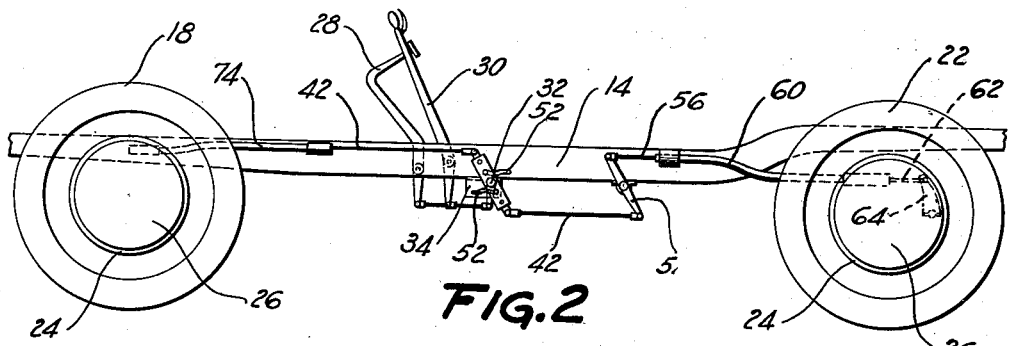
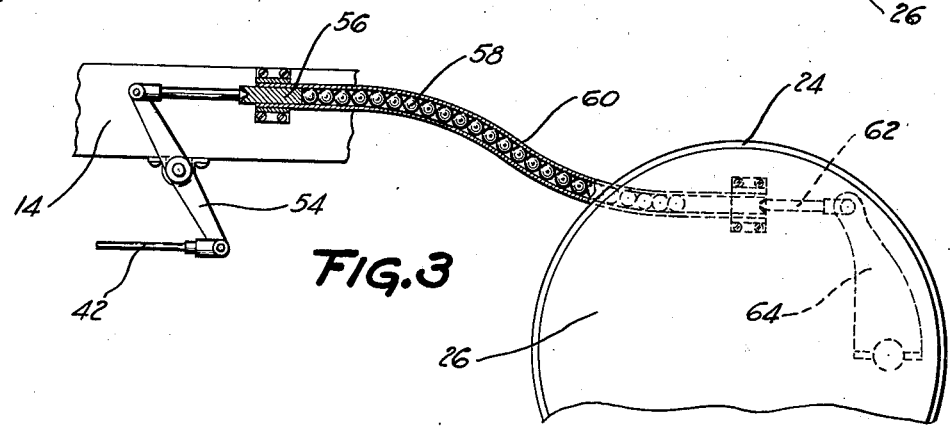
INVENTOR.
RUDOLPH A. GOEPFRICH
BY
ATTORNEYS.

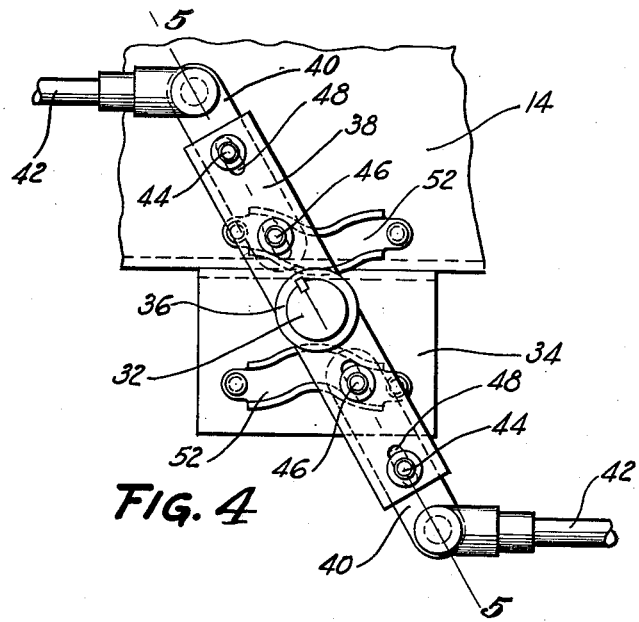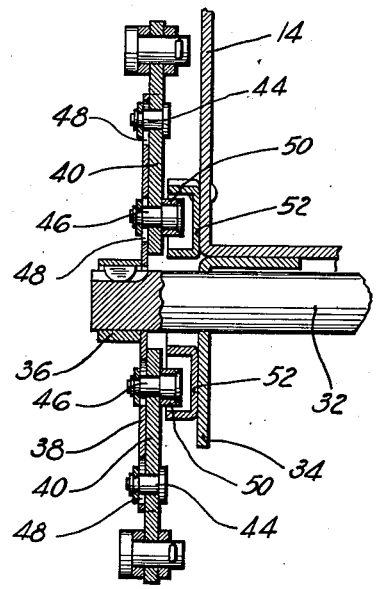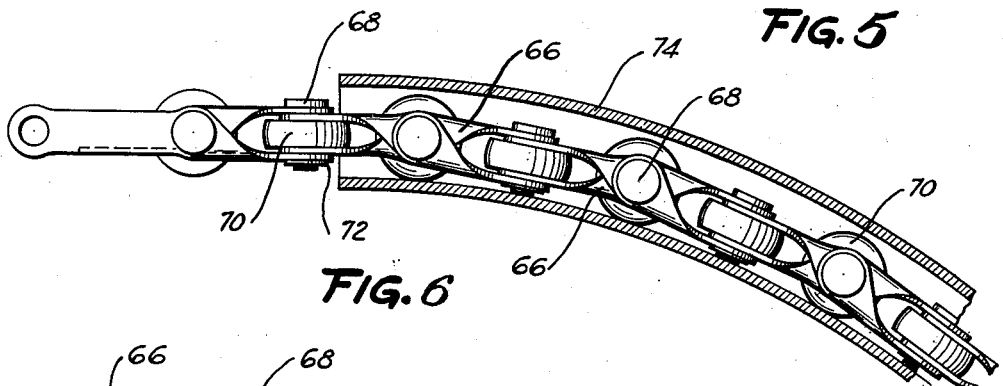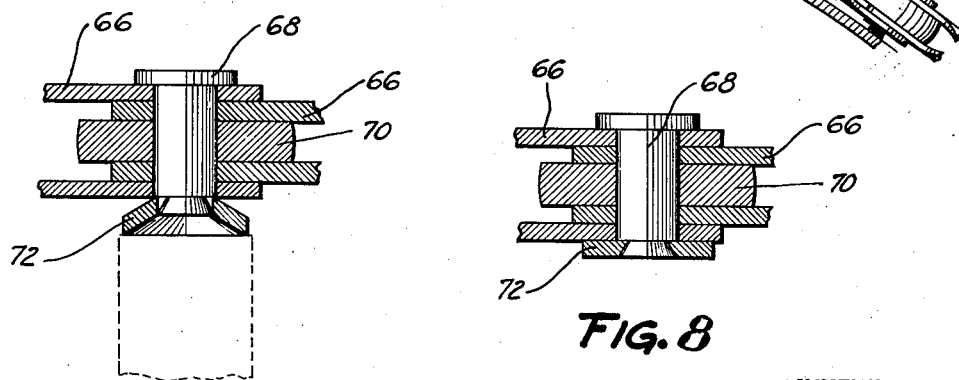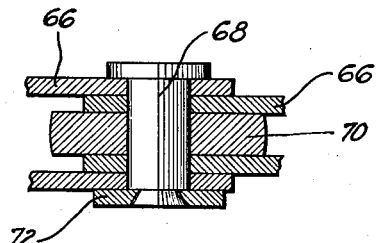

Patented July 20, 1937

2,087,378

UNITED STATES PATENT OFFICE 2,087,378

BRAKE

Rudolph A. Goepfrich, South Bend, Ind., assignor to Bendix Brake Company, South Bend, Ind., a corporation of Illinois Original application December 1, 1932, Serial No. 645,307. Divided and this application December 9, 1935, Serial No. 53,609

3 Claims. (Cl. 74—518)

This invention relates to brakes, and is illustrated as embodied in a novel mechanical system for operating a set of four-wheel brakes for an automobile.

An object of the invention is to rovide means for automatically varying the leverage on the brakes during the depression of the pedal or its equivalent, for example to take up the slack quickly and then apply heavy pressure to the brakes, or for any other desired reason.

The operating mechanism illustrated includes a cross shaft having at its ends double levers connected to the respective brakes, and I prefer to make these levers of telescoping parts shifted by engagement with stationary cams or the like to give the desired variation in leverage. If desired the variation of leverage on the front brakes at the end of the throw of the pedal may be different from that on the rear brakes.

The above and other objects and features of the invention, including various novel combinations of parts and desirable particular constructions, will be apparent from the following description of the illustrative embodiment shown in the accompanying drawings, in which:

Figure 1 is a diagrammatic top plan view of an automobile chassis provided with the above-described four-wheel brake system;

Figure 2 is a diagrammatic side elevation of the chassis;

Figure 3 is a view of part of the rear (right) portion of Figure 2, on a larger scale and with the connecting conduit leading to the brake shown in vertical section;

Figure 4 is an elevation, on a larger scale than Figure 2, of the end of the brake cross shaft and associated parts;

Figure 5 is a section through the novel levers on the end of the shaft, on the line 5—5 of Figure 4;

Figure 6 is a section, on an enlarged scale, through the conduit leading to one of the front brakes;

Figure 7 shows the manner of forming the joint between two adjacent links shown in Figure 6; and Figure 8 is a section showing the finished joint.

The chassis illustrated includes a frame 14, supported through the usual vehicle springs (not shown) on a front axle 16 having swiveled thereto road wheels 18 and on a rear axle 20 having road wheels 22. Each wheel is provided with a brake including a drum 24 rotating with the wheel, and a support such as a backing plate 26 mounted on the axle or knuckle at the open side of the drum.

The brakes may be operated either by a pedal 28 or a hand lever 30, both acting on a cross shaft 32 journaled in bearing openings in brackets or the like 34 (Figure 5) riveted to the side members of frame 14.

Shaft 32 is shown (see Figures 4 and 5) provided at its end with a hub 36 keyed thereto and which has welded to it a stamping 38 folded around to form oppositely-extending hollow arms telescopically embracing slide arms 40 connected to the brakes by tension rods 42. Slide arms 40 have a pair of guide pins 44 and 46 guidingly received in slots 48 in the hollow arms 38. Guide pins 46 project inwardly far enough to be provided with cam rollers 50 received in fixed generally-horizontal curved cam slots or guideways 52 riveted to the chassis frame members 14 and the bracket 34.

The guideways or cams 52 are so shaped as to shift the slide arms 40 in and out, to give whatever effective motion is desired, and are illustrated as being arranged to give straight-line movement to the rods 42. The cams for the front brakes may if desired be different from those for the rear brakes.

The rear brake rods 42 are shown connected to double-ended levers 54 actuating thrust plungers 56 each of which pushes against a series of steel balls 58 arranged in a flexible inextensible conduit 60 having in its other end a thrust plunger 62 actuating the brake lever 64 The rear end of each conduit 60 extends through the backing plate 26 of one of the rear brakes and is secured thereto by a suitable bracket, and the front end is secured by a similar bracket to the side of the chassis frame.

The front brake rods 42 are connected to flexible tension elements shown as consisting of pairs of twisted stamped steel links 66, adjacent pairs of which are connected by pivot pins 68 pivotally carrying rollers 70 arranged alternately at right angles to each other. Pivot pins 68 may be formed with reduced undercut ends to interlock with washers 72 forced into place as shown in Figure 7.

The above-described flexible tension element is slidably housed in a conduit 74 secured at one end to the chassis frame and at its forward end to the backing plate 26 of the front brake, inside of the brake.

The tension element is connected, inside the brake, to suitable operating levers similar to the levers 64.

While one illustrative embodiment has been described in detail, it is not my intention to limit the scope of my invention to that embodiment, or otherwise than by the terms of the appended claims. The present application is a division of my application No. 645,307, filed December 1, 1932.

I claim:

1. An automobile chassis provided with a brake-actuating shaft having oppositely-extending operating arms, and means mounted on the chassis separately from said arms and shaft and cooperating therewith to change the lengths of said arms when the shaft is operated.

2. A brake-actuating shaft having oppositely-extending operating arms including telescoping parts, and means for sliding said parts on each other to change the lengths of said arms when the shaft is operated.

3. An automobile chassis comprising mechanism for operating brakes or the like provided with parts which are relatively shiftable lengthwise of each other during the operation of operating said mechanism to change the effective leverage of said mechanism and cam means stationarily mounted on the chassis and operatively engaging certain of said parts to shift them as the mechanism is operated.

RUDOLPH A. GOEPFRICH.